US007783451B2

(12) United States Patent
Wilcox et al.

(10) Patent No.: US 7,783,451 B2
(45) Date of Patent: Aug. 24, 2010

(54) ARRANGEMENT AND METHOD FOR ASCERTAINING WHETHER A SET OF MEASUREMENTS IS ACCEPTABLE FOR USE IN DETERMINING A TIME OF FLIGHT OF SIGNALS

(75) Inventors: Martin S. Wilcox, Redhill (GB); Frank Boeh, Buchholz (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 44 days.

(21) Appl. No.: 11/813,098

(22) PCT Filed: Jan. 9, 2006

(86) PCT No.: PCT/IB2006/050073

§ 371 (c)(1),
(2), (4) Date: Jun. 30, 2008

(87) PCT Pub. No.: WO2006/075280

PCT Pub. Date: Jul. 20, 2006

(65) Prior Publication Data

US 2009/0006032 A1  Jan. 1, 2009

(30) Foreign Application Priority Data

Jan. 11, 2005  (GB) ................ 0500460.1

(51) Int. Cl.
*G04F 10/00* (2006.01)
(52) U.S. Cl. .............. 702/176; 702/158; 340/5.61; 342/118

(58) Field of Classification Search .......... 702/176
See application file for complete search history.

(56) References Cited

U.S. PATENT DOCUMENTS

| 4,937,812 A | 6/1990 | Itoh et al. |
| 5,526,357 A * | 6/1996 | Jandrell ................ 370/346 |
| 6,580,353 B1 * | 6/2003 | Geber et al. ............ 340/5.61 |
| 6,844,816 B1 * | 1/2005 | Melton et al. .......... 340/572.1 |

(Continued)

FOREIGN PATENT DOCUMENTS

EP        0983916 A1     3/2000

(Continued)

OTHER PUBLICATIONS

Alrabady et al: "Some Attacks Against Vehicles Passive Entry Security Systems and Their Solutions": IEEE Transactions on Vehicular Technology, vol. 52, No. 2, pp. 431-439, Mar. 2003.

*Primary Examiner*—Bryan Bui
*Assistant Examiner*—Jonathan Teixeira Moffat

(57) ABSTRACT

First and second devices (7, 8) are configured to transmit and receive signals wirelessly and have first and second clocks respectively for determining signal transmission and arrival times. The first device transmits first and second signals (9, 10) and the second device transmits a third signal (11). By introducing a delay into the first signal, a thief may be able to fool the devices into thinking that they are closer than they really are. To help identify if a delay has been introduced into the first signal, the first device calculates a ratio of clock rates for the first and second clocks and determines whether the calculated ratio falls within a predefined range.

26 Claims, 6 Drawing Sheets

U.S. PATENT DOCUMENTS

| | | |
|---|---|---|
| 2001/0053174 A1 | 12/2001 | Fleming et al. |
| 2003/0001723 A1* | 1/2003 | Masudaya .................. 340/5.61 |
| 2004/0185844 A1 | 9/2004 | Neuman |
| 2006/0083406 A1* | 4/2006 | Ishimura et al. ............. 382/106 |

FOREIGN PATENT DOCUMENTS

| | | |
|---|---|---|
| EP | 1288841 A1 | 3/2003 |
| FR | 2781076 A | 1/2000 |
| FR | 2781076 A1 | 1/2000 |
| WO | WO0012849 A1 | 3/2000 |
| WO | WO2004048997 A1 | 6/2004 |
| WO | WO2004053522 A1 | 6/2004 |

* cited by examiner

ARRANGEMENT AND METHOD FOR ASCERTAINING WHETHER A SET OF MEASUREMENTS IS ACCEPTABLE FOR USE IN DETERMINING A TIME OF FLIGHT OF SIGNALS

FIELD OF INVENTION

The present invention relates to a processing arrangement for and a method of determining time of flight particularly, but not exclusively, in a keyless entry system.

Time of flight of a signal can be used to determine a distance between two devices. A first device transmits a signal at a first time (usually referred to as the "time of transmission") and a second device receives the signal at a second time (referred to as the "time of arrival"). A time of flight can be computed by subtracting the time of transmission from the time of arrival. The signal propagates at a known speed and so a separation or range between the devices can be computed.

Usually, two or more signals are exchanged between the devices, whereby a second signal is used to report time of arrival and/or time of transmission of the first signal. For example, the first device transmits a first signal to the second device and, in turn, the second device transmits a second signal to the first device. The second signal reports a time of arrival of the first signal at the second device. This allows the first device to compute time of flight of the first signal and, thus, the separation or range between the devices. Often, devices run their internal clocks from low-tolerance crystals. Consequently, clocks of two different devices rarely "tick", in other words advance, at the same rate and are unlikely to tell the same time. A disparity or offset between the clock times can result in a spurious value of time of flight. Furthermore, if the clock rates differ, then the disparity will continually vary.

Measures can be taken to compensate for timing offsets and differing clock rates so as to provide accurate values of time of flight and distance. For example, WO-A-2004048997 describes a method of determining a range between a mobile station and a base station in which the mobile station can compensate for differing clock rates between its clock and the base station's clock. The mobile station transmits first and second signals to the base station. In return, the base station transmits a third signal back to the mobile station. The third signal reports respective time of arrivals for the first and second signals and a time of transmission of the third signal. Thus, the mobile station has the times of transmission and arrival for each signal. Any delay between receiving the first and second signals at the base station should be the same as the delay between transmitting the signals from the mobile station because both signals travel at the same speed. However, if the delays computed using measured times differ, then this can be attributed to differing clock rates. Thus, the mobile station computes a value of range using a correction factor. The correction factor is the ratio of the difference between the measured times of transmission of the first and second signals from the mobile station and the difference between the measured times of arrival of the signals at the base station.

Time of flight measurements can be used in systems to help protect high value items or gain access to vehicles, buildings or other areas. Examples of such systems include vehicular Passive Keyless Entry (PKE) and Remote Keyless Entry (RKE) systems, wherein a time of flight measurement can be used to determine reliably and securely a proximity of, for example, a key fob and a vehicle. Upon confirmation that the key fob is within a predefined, valid proximity, the vehicle may be instructed to unlock the doors, allowing the owner to access the vehicle.

These systems, however, are susceptible to so-called "relay attack". In a relay attack, a signal is intercepted by a relaying device, amplified and transmitted, possibly on a different frequency. The purpose of a relay attack is to fool the system into believing that two devices are closer than they actually are. Relay attacks are described in more detail in "Some Attacks Against Vehicles' Passive Entry Security Systems and Their Solutions", A. I. Alrabady and S. M. Mahmud, IEEE Transactions on Vehicular Technology, Vol. 52 No. 2, pp 431-439, March 2003.

The system described earlier in WO-A-2004048997 is vulnerable to relay attack in that it cannot distinguish between an increase in time of flight arising from an attack and one which occurs because of increased separation. One solution is to use an answer signal only if it arrives within a set time window, for example as described in US-A-20030001723. However, this is restrictive and, even then, it may still be possible to fool the system into thinking that the two devices are closer than they really are.

The present invention seeks to provide an improved processing arrangement for determining time of flight and an improved method of determining time of flight.

BRIEF SUMMARY OF THE INVENTION

According to a first aspect of the present invention there is provided a processing arrangement for determining time of flight between first and second devices, the processing arrangement configured to receive a value of a first time difference between first and second times of transmission of respective first and second signals transmitted from a first device, to receive a value of a second time difference between first and second times of arrival of the, or other, first and second signals received at a second device and to determine whether the value of the second time difference falls within a range of expected values based upon the value of the first time difference and a predefined condition.

Thus, if a delay is introduced into the first, but not the second, signal in attempt to fool a system that the first and second devices are closer than they really are, then the delay can be detected.

The range of expected values may comprise a set of expected values and the device may be configured to determine whether the value matches one of the expected values within the set. The range of expected values may comprise a single expected value and the device may be configured to determine whether the value matches an expected value.

To determine whether the value of the second time difference falls within a range of expected values, the processing arrangement may be configured to calculate a ratio of the values of the first and second time differences and to determine whether the ratio falls within a range of predefined ratios. To determine whether the value of the second time difference falls within a range of expected values, the processing arrangement may be configured to calculate a difference between the values of the first and second time differences and to determine whether the difference falls within a predetermined range of differences. The processing arrangement may be configured to adjust the difference or the predetermined range of differences by a factor dependent upon the value of the first time difference.

According to a second aspect of the present invention there is provided a first device for co-operating with a second device to determine a time of flight between the first and second devices, the first device comprising the processing arrangement, a first transmitter, a first receiver and a first clock, the first device configured to transmit first and second signals, to determine first and second times of transmission using the first clock and to calculate a value of the first time difference between times of transmission.

The first device may be configured to receive a third signal from the second device and to extract from the third signal information for obtaining a value of a second time difference between first and second times of arrival of the, or other, first and second signals received at the second device. The information may be the value of the second time difference between first and second times of arrival of the, or the other, first and second signals received at the second device.

The first device may be configured to variably choose the second time of transmission with respect to the first time of transmission. This can have the advantage of making it difficult for a thief to use previous set of measurements during a relay attack.

The value of the first time difference between the first and second times of transmission of the respective first and second signals for a set of signals may differ from a value of first time difference between the first and second times of transmission of respective first and second signals for a previous set of signals. The transmitter and receiver may be provided in a transceiver. According to a third aspect of the present invention there is provided a system comprising the first device and a second device, the second device comprising a second transmitter, a second receiver and a second clock, the second device configured to receive the, or the other, first and second signals, to determine times of arrival of the, or the other, first and second signals using the second clock, to prepare information for obtaining the value of the difference between times of arrival of the or the other first and second signals and to transmit the third signal including the information.

According to fourth aspect of the present invention there is provided a device for relaying signals between first and second devices, the device comprising a receiver, a transmitter and a delay unit and configured to receive first and second signals from the first device and a third signal from the second device, to delay the first, second and third signals by a given amount, to delay the first, but not the second and third signals, by an additional, predetermined amount and to transmit delayed copies of the first, second and third signals. According to fifth aspect of the present invention there is provided a method of determining time of flight between first and second devices the method comprising receiving a value of a first time difference between first and second times of transmission of respective first and second signals transmitted from a first device, receiving a value of a second time difference between first and second times of arrival of the, or other, first and second signals received at a second device and determining whether the value of the second time difference falls within a range of expected values based upon the value of the first time difference and a predefined condition.

Determining whether the value of the second time difference falls within the range of expected values may comprise determining whether the value of the second time difference matches one of the expected values within the set. Determining whether the value of the second time difference falls within the range of expected values may comprise determining whether the value matches an expected value. Determining whether the value of the second time difference falls within the range of expected values may comprise calculating a ratio of the values of the first and second time differences and determining whether the ratio falls within a range of predefined ratios. Determining whether the value of the second time difference falls within the range of expected values may comprise calculating a difference between the values of the first and second time differences and determining whether the difference falls within a predetermined range of differences. The method may further comprise adjusting the difference or the predetermined range of differences by a factor dependent upon the value of the first time difference.

The method may further comprise transmitting first and second signals, determining first and second times of transmission using a first clock and calculating a value of the first time difference between times of transmission. The method may further comprise receiving a third signal and extracting from the third signal information for obtaining a value of a second time difference between first and second times of arrival of the, or other, first and second signals received at a second device. The method may further comprise obtaining the value of the second time difference between first and second times of arrival of the, or the other, first and second signals received at the second device. Obtaining the value of the second time difference between first and second times of arrival of the, or the other, first and second signals received at the second device may comprise reading the value. The method may comprise variably choosing the second time of transmission with respect to the first time of transmission. The method may comprise differing the value of the first time difference between the first and second times of transmission of the respective first and second signals for a set of signals from a value of first time difference between the first and second times of transmission of respective first and second signals for a previous set of signals.

According to sixth aspect of the present invention there is provided a computer program comprising instructions which, when executed by data processing apparatus, causes the data processing apparatus to perform the method.

According to seventh and eighth aspects of the present invention there are provided respectively a computer-readable medium storing the computer program and a signal carrying the computer program.

BRIEF DESCRIPTION OF THE DRAWINGS

Embodiments of the present invention will now be described, by way of example, with reference to the accompanying drawings, in which:

FIGS. 6-1 and 6-2 show a process flow diagram of a method of operating the first device shown in FIG. 4 in accordance with the present invention.

DETAILED DESCRIPTION OF THE INVENTION

To help understand the present invention, it may be helpful to consider some disadvantages of using the prior art method of measuring time of flight described in WO-A-2004048997.

Figure 1:
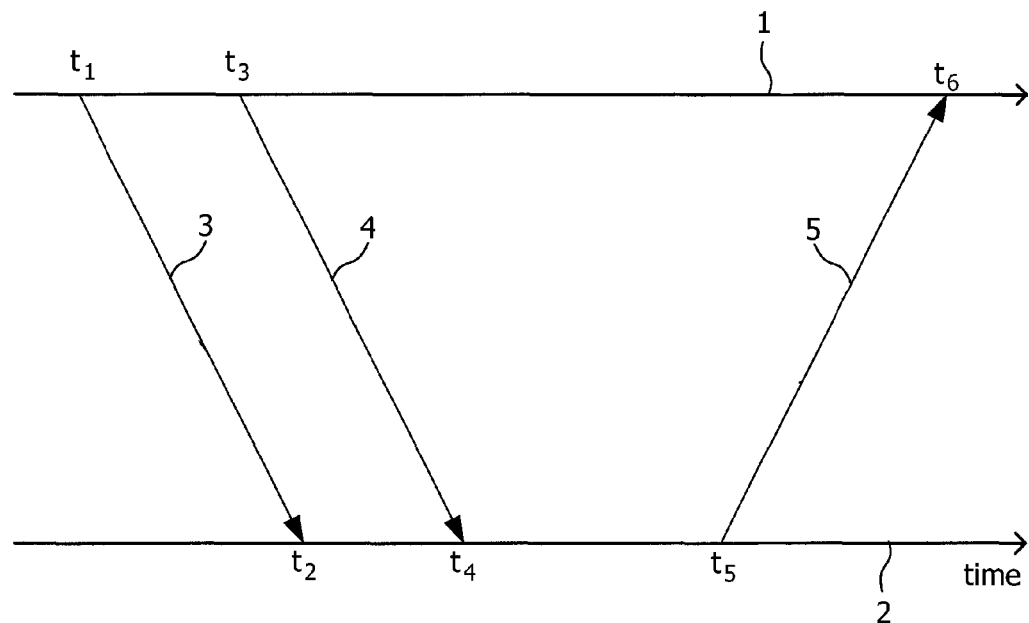
FIG. 1 illustrates an exchange of signals between first and second devices in a prior art method of ranging.

Referring to FIG. 1, an exchange of signals between first and second devices 1, 2 is shown. The first and second devices 1, 2 are each configured to transmit and receive signals wirelessly and have first and second clocks (not shown) respectively. A first signal 3 is transmitted from the first device 1 at time $t_1$ determined according to the first clock (not shown) and arrives at the second device 2 at time $t_2$ determined according to the second clock (not shown). A second signal 4 is transmitted from the first device 1 at time $t_3$ determined according to the first clock (not shown) and arrives at the second device 2 at time $t_4$ determined according to the second clock (not shown). A third signal 5 is transmitted from the second device 2 at time $t_5$ determined according to the second clock (not shown) and arrives at the first device 1 at time $t_6$ determined according to the first clock (not shown).

A time of flight, ToF, is determined using the following equation:

$$ToF = \frac{1}{2}\left[(t_6 - t_3) - (t_5 - t_4) \times \frac{(t_3 - t_1)}{(t_4 - t_2)}\right] \quad (1)$$

Equation (1) includes a correction factor to allow for a difference in clock rates of the clocks (not shown) in each device 1, 2, namely:

$$\frac{(t_3 - t_1)}{(t_4 - t_2)} \quad (1a)$$

The signals 3, 4, 5 are exchanged wirelessly and thus are prone to noise and multipath effects. This introduces errors into the measured times of arrival $t_2$, $t_4$, $t_6$.

If first, second and third errors $\epsilon_1$, $\epsilon_2$, $\epsilon_3$ are introduced into the times of arrival of the first, second and third signals 3, 4, 5 respectively, then a total error, $\epsilon_{TOT}$, resulting from the errors is given by:

$$\varepsilon_{TOT} = -\frac{1}{2}\left[\frac{(t_5 - t_4)}{(t_4 - t_2)}\right]\varepsilon_1 + \frac{1}{2}\left[\frac{(t_5 - t_2)}{(t_4 - t_2)}\right]\varepsilon_2 + \frac{1}{2}\varepsilon_3 \quad (2)$$

Equation (2) represents a total error in determining a time of flight, ToF. The prior art method of measuring time of flight is susceptible to relay attack, as will now be explained.

Figure 2:
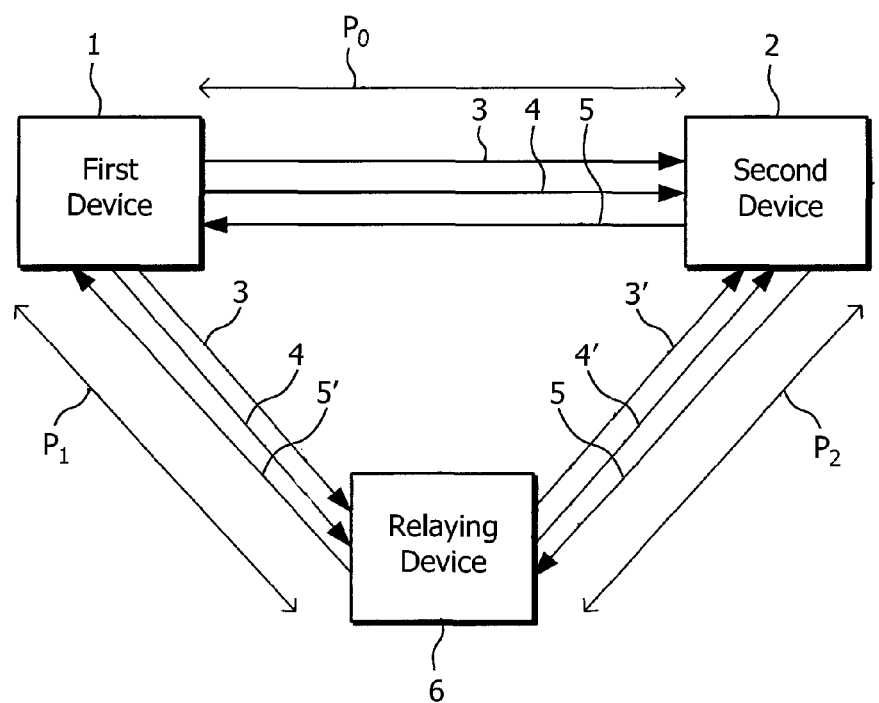
FIG. 2 illustrates a relay attack.

Referring to FIG. 2, a thief (not shown) carries out a relay attack by using a relaying device 6 to relay the first, second and third signals 3, 4, 5 in an attempt to fool the first device 1 that the second device 2 is closer than it really is. The relaying device 6 comprises a receiver (not shown), a transmitter (not shown) and a delay unit (not shown) for introducing a predetermined or selectable delay into a signal. The relaying device 6 may include a user interface (not shown) for allowing a thief to select a signal and enter a value of delay. Additionally or alternatively, the relaying device 6 may include a processing unit (not shown) to measure signals and to compute a delay. The relaying device 6 receives the first signal 3 travelling along a first path $P_1$ and transmits a copy 3' of the first signal 3. The second device 2 receives the first signal copy 3' along a second path $P_2$. Likewise, the relaying device 6 makes copies 4', 5' of the second and third signals 4, 5.

Times of arrival of the first and second signal copies 3', 4' at the second device 2 and time of arrival of the third signal copy 5' at the first device 1 are each delayed by a time $\tau$. This is because signals travelling via the relaying device 6 along an indirect path comprising paths $P_1$, $P_2$ travel further than signals travelling along a direct path $P_0$ between the first and second devices 1, 2 and because the relaying device 6 introduces delays by receiving, processing and transmitting signals. A typical value of $\tau$ is of the order of 1 microsecond.

It can be assumed that the delay introduced by relaying is greater than any delay caused by noise and multipath effects. Thus, the first, second and third errors $\epsilon_1$, $\epsilon_2$, $\epsilon_3$ can be set equal to the delay $\tau$, namely:

$$\epsilon_1 = \epsilon_2 = \epsilon_3 = \tau \quad (3)$$

Substituting equation (3) into equation (2) yields $\epsilon_{TOT} = \tau$. This means that the delay $\tau$ introduced by the relaying process causes a recognisable error in the time of flight measurement. If $\tau$ is sufficiently large, then it is possible to identify a relay attack because a calculated value of time of flight is too high. However, the thief may still be able to fool the system that there has been no relay attack and that the first and second devices 1, 2 are closer than they really are by introducing a further delay d into a signal so as to compensate for the effect of the delay $\tau$ such that $\epsilon_{TOT} = 0$. The further delay d is introduced electronically in the relaying device 6 using the delay unit (not shown).

Table 1 below illustrates three cases in which a further delay d can be introduced into one of the signals 3, 4, 5 to achieve $\epsilon_{TOT} = 0$. For each case, one of the error values is set to ($\tau + d$) and the other two error values each remain fixed at $\tau$. These values are substituted in equation (2) above with $\epsilon_{TOT} = 0$ and the resultant equation is solved to find d.

TABLE 1

| | Total delay $\epsilon_1$ in the first signal 3 | Total delay $\epsilon_2$ in the second signal 4 | Total delay $\epsilon_3$ in the third signal 5 | Further delay d |
|---|---|---|---|---|
| Case 1 | $\tau + d$ | $\tau$ | $\tau$ | $+2\left(\frac{t_4 - t_2}{t_5 - t_4}\right)\tau$ |
| Case 2 | $\tau$ | $\tau + d$ | $\tau$ | $-2\left(\frac{t_4 - t_2}{t_5 - t_2}\right)\tau$ |
| Case 3 | $\tau$ | $\tau$ | $\tau + d$ | $-2\tau$ |

It can be seen from Table 1 that if a further delay is added to the second or third signal 4, 5, then a negative value of d is required for $\epsilon_{TOT} = 0$. Thus, no workable further delay can be introduced into either the second or third signals 4, 5.

However, it is possible to introduce a further delay into the first signal 3 to achieve $\epsilon_{TOT} = 0$, namely:

$$d = +2\left(\frac{t_4 - t_2}{t_5 - t_4}\right)\tau \quad (4)$$

Assuming that the thief can determine the value of delay τ, one way in which the thief could determine the required value of d is to measure previous values of ($t_4$-$t_2$) and ($t_5$-$t_4$) by monitoring earlier transmissions between the first and second devices 1, 2. Another way is to use trial and error in the hope of eventually guessing the correct value of d. Either way, the prior art system has a disadvantage that it can be fooled into thinking that there has been no relay attack and that the first and second devices 1, 2 are closer than they really are.

It is noted that even though it is possible for the thief to force $\epsilon_{TOT}$=0 by adding a specific value of further delay d to the first signal 3, they cannot make τ=0. As explained earlier, this is because signals travelling via the relaying device 6 along an indirect path travel further than signals travelling directly between the first and second devices 1, 2 and because the relaying device 6 unavoidably introduces a delay.

In the method described earlier, the first device 1 consecutively transmits two signals 3, 4 and the second device 2 transmits one signal 5 in response after having received the second of the two signals 3, 4. In an alternative method, the first and second devices 1, 2 can take it in turns to transmit one signal at a time, in other words the first device 1 transmits one signal (not shown), the second device 2 transmits one signal (not shown) in response and the first device 1 transmits another signal (not shown). The alternative method has an advantage over the earlier-described method in that no workable (i.e. positive-valued) further delay can be added to any one signal to achieve $\epsilon_{TOT}$=0. However, the alternative method has a drawback that the second device 2 receives timing information.

Figure 3:
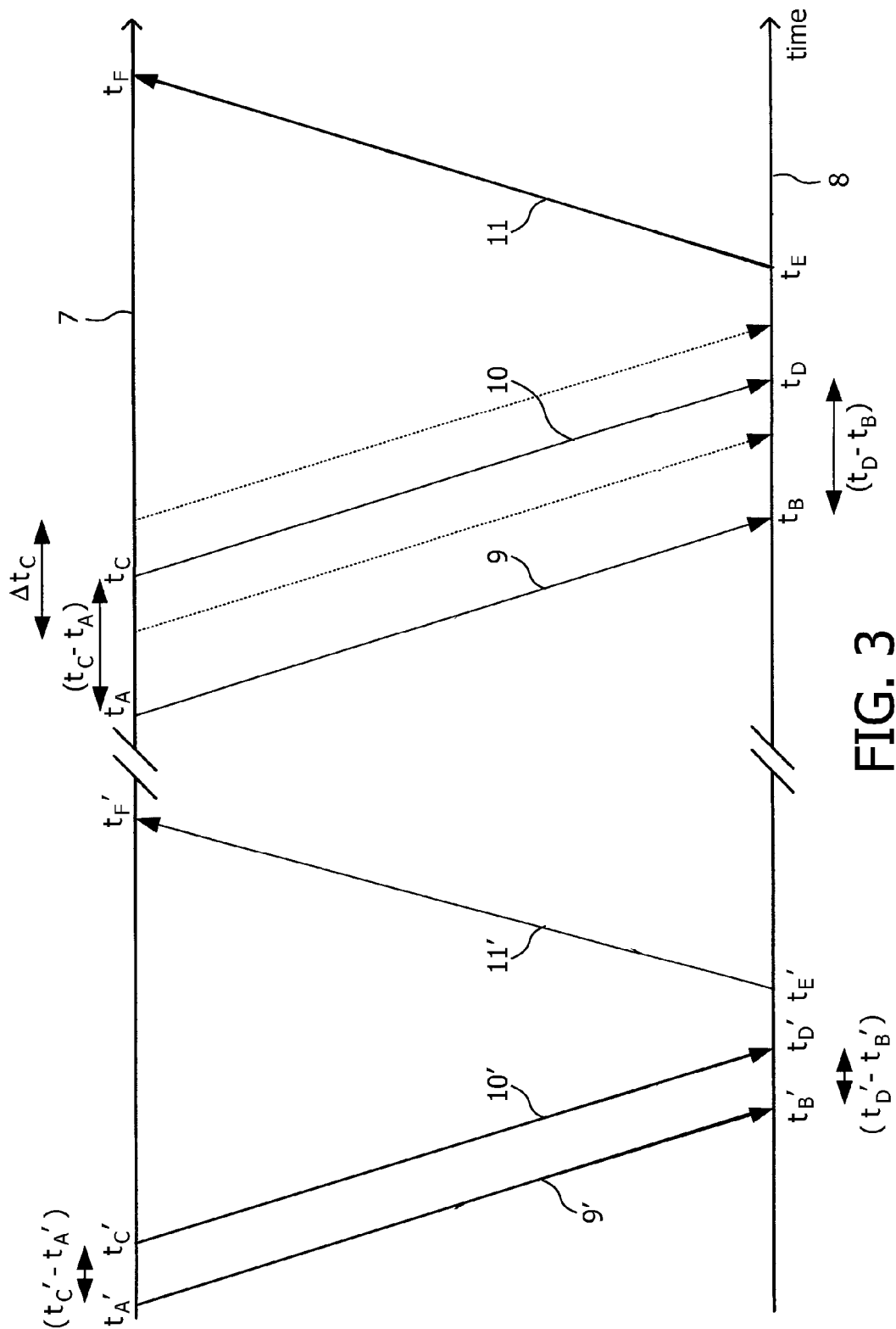
FIG. 3 illustrates exchange of signals between first and second devices in accordance with the present invention.
Figure 4:
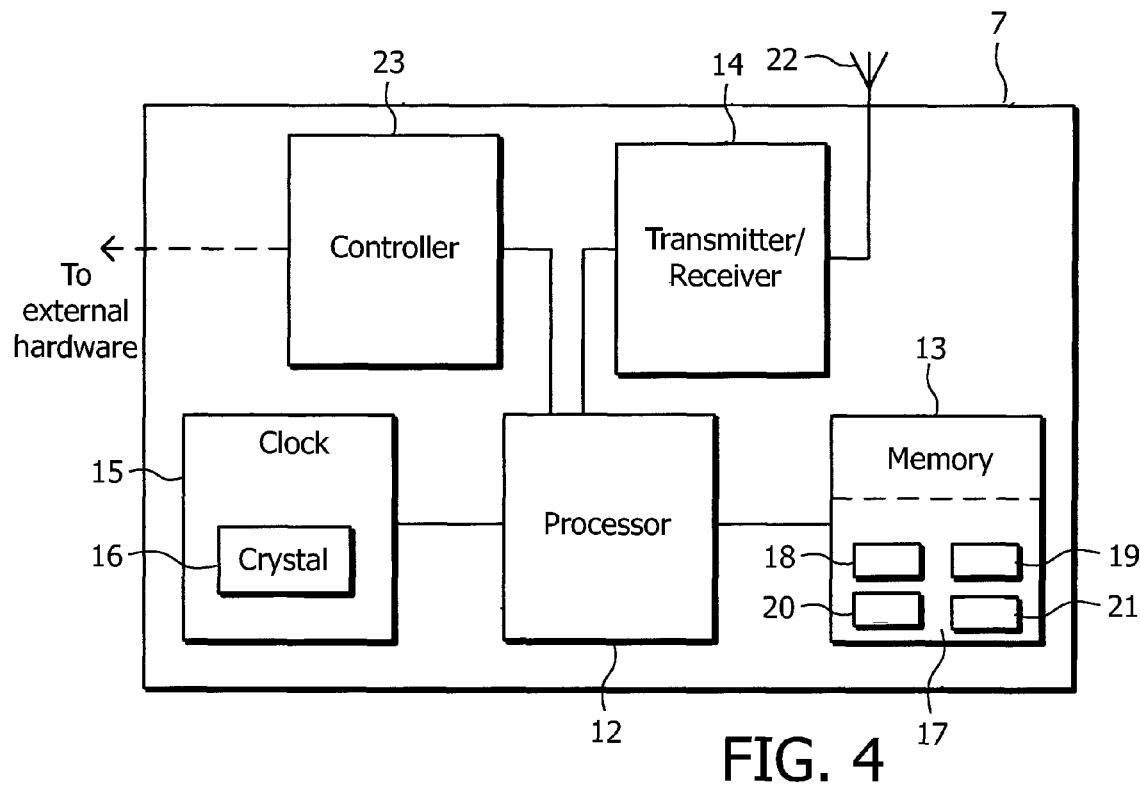
FIG. 4 is a schematic diagram of a first device in accordance with the present invention.
Figure 5:
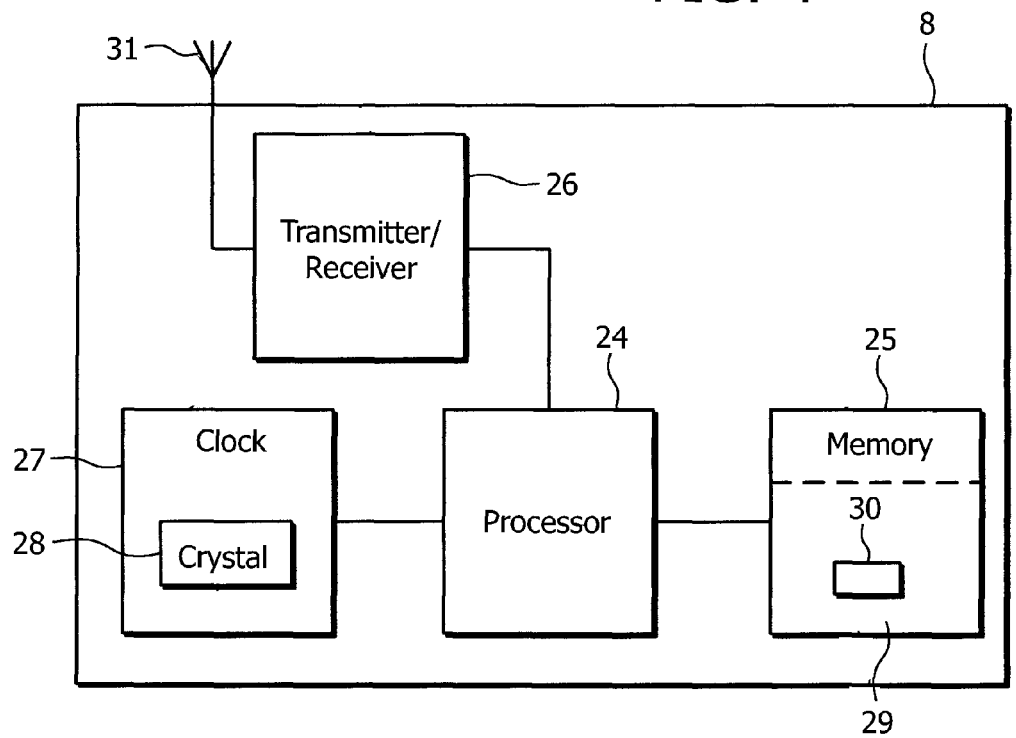
FIG. 5 is a schematic diagram of a second device in accordance with the present invention.

Referring to FIG. 3, first and second devices 7, 8 in accordance with the present invention are shown. The first and second devices 7, 8 are each configured to transmit and receive signals wirelessly and have first and second clocks 15 (FIG. 4), 27 (FIG. 5) respectively. The first and second devices 7, 8 will be described in more detail later. When not under relay attack, a first signal 9 is transmitted from the first device 7 at time $t_A$ determined according the first clock 15 (FIG. 4) and arrives at the second device 8 at time $t_B$ determined according to the second clock 27 (FIG. 5). A second signal 10 is transmitted from the first device 7 at time $t_C$ determined according to the first clock 15 (FIG. 4) and arrives at the second device 8 at time $t_D$ determined according to the second clock 27 (FIG. 5). A third signal 11 is transmitted from the second device 8 at time $t_E$ determined according to the second clock 27 (FIG. 5) and arrives at the first device 7 at time $t_F$ determined according to the first clock 15 (FIG. 4).

To make it more difficult for a thief using a relay device 6 (FIG. 2) to find a value of further delay d to add to the first signal 9 so as to fool the system into thinking that the devices 7, 8 are closer than they really are, the first device 7 is configured to transmit the second signal 10 at a time $t_C$ variably chosen with respect to $t_A$, for instance within a range $\Delta t_C$. A value of $t_C$ is chosen such that $t_A$<$t_C$. If $t_E$ is known, then the value of $t_C$ may also be chosen such that $t_C$<$t_E$. A time $t_C$ may be chosen randomly or chosen from a pseudo-random sequence.

In this way, a time difference ($t_C$-$t_A$) between times of transmission of the first and second signals 9, 10 in a given set of signals 9, 10, 11 differs from a time difference ($t_C'$-$t_A'$) between times of transmission of first and second signals 9', 10' in another set of signals 9', 10', 11' previously transmitted from the first device 7. In other words, the first device 7 jitters the second signal 10 from one set of signals to another. The first device 7 may jitter the first signal 9 and the second device 8 may jitter the third signal 11.

Substituting $t_A$, $t_B$, $t_C$, $t_D$, $t_E$, $t_F$ for $t_1$, $t_2$, $t_3$, $t_4$, $t_5$, $t_6$ respectively in equation (4) above, it can be seen that if $t_C$ is varied with respect to $t_A$ and $t_E$ from one set of signals to another, then the value of d also varies. Thus, jittering the second signal 10 helps to make any attempt, by a thief, to find d by trial and error more difficult.

It is noted that time of arrival $t_D$ of the second signal 10 is inherently dependent upon the time of transmission $t_C$ of the signal 10 from the first device 7. Thus, a difference ($t_D$-$t_B$) in the times of arrival of the first and second signals 9, 10 in a current set of signals will differ from a difference ($t_D'$-$t_B'$) in the times of arrival of the first and second signals 9', 10' in a previous set of signals. Therefore, even if the thief had measured values of ($t_D'$-$t_B'$) and ($t_E'$-$t_D'$), it is highly unlikely that the thief can use these previous values to calculate a value of further delay d for a current set of signals.

The first device 7 determines a time of flight (ToF) using the following equation:

$$ToF = \frac{1}{2}\left[(t_F - t_C) - (t_E - t_D) \times \frac{(t_C - t_A)}{(t_D - t_B)}\right] \quad (1')$$

Usually, if the accuracy with which the times are determined is reduced, then the range of values of time of flight which are deemed to be acceptable is increased to compensate. However, in doing this, it becomes more likely that a previous value of further delay d could be successfully used. To counter this problem, a wider range $\Delta t_C$ can used.

To help identify whether a further delay d has been introduced into a copy of the first signal 9, the first device 7 is configured to calculate a ratio of the clock rates of the clocks 15 (FIG. 4), 27 (FIG. 5) for the first and second devices 7, 8 and determine whether the ratio is acceptable according to a predefined condition, such as whether it falls within a predefined range.

The clock rate ratio may be defined by equation (5) below:

$$f_{clock27} / f_{clock15} = \frac{t_D - t_B}{t_C - t_A} \quad (5)$$

where $t_A$ and $t_C$ are times of transmission of the first and second signals 9, 10 from the first device 7 and $t_B$ and $t_D$ are times of arrival of the first and second signals 9, 10 or other first and second signals, such as copies (not shown) of the first and second signals 9, 10.

As explained earlier, during a relay attack, a relay device 6 (FIG. 2) can transmit copies (not shown) of the signals 9, 10, 11 with each copy delayed by a time τ and the copy (not shown) of the first signal 9 delayed by a further amount d. Thus, the difference ($t_C$-$t_A$) in the times of transmission of the first and second signals 9, 10 will differ from the difference ($t_D$-$t_B$) in the times of arrival of the copies of the first and second signals 9, 10. A value of clock rate ratio $f_{clock\,27}/f_{clock\,15}$ during a relay attack will differ from expected values or fall outside an expected range of values. Thus, introduction of a delay into one but not another signal can be thought of as effectively altering the clock rate of the second clock 27 (FIG. 5).

Expected values can be theoretically determined, factory-measured or derived from accumulated measured values during use. The expected values may be tabulated and/or used to generate a range of expected values. The devices 7, 8 may include temperature sensors (not shown). Thus, the expected values or the range of expected values can be adjusted to compensate for frequency variations arising from temperature changes in the crystal oscillators 16 (FIG. 4), 28 (FIG. 5).

Wild values of $f_{clock\ 27}/f_{clock\ 15}$ that do not match with an expected value or do not fall within a range of expected values can be dismissed as signifying a relay attack.

There are several ways in which timing information for calculating time of flight and the clock rate ratio $f_{clock\ 27}/f_{clock\ 15}$ can be exchanged between the first and second devices 7, 8.

The first device 7 can store values of the times of transmission of the first and second signals 9, 10, namely $t_A$ and $t_C$, or the difference in the times of transmission of the first and second signals 9, 10, namely $(t_C-t_A)$ and receive values of the times of arrival of the, or other, first and second signals 9, 10, namely $t_B$ and $t_D$, or the difference in the times of arrival of the, or other, first and second signals 9, 10, namely $(t_D-t_B)$, from the second device 8. This way minimises the amount of data being transmitted between the first and second devices 7, 8 and thus helps to prevent eavesdropping and tampering.

The first device 7 can send the values of the times of transmission of the first and second signals 9, 10, namely $t_A$ and $t_C$, or the difference in the times the times of transmission of the first and second signals 9, 10, namely $(t_C-t_A)$, to the second device 8 in the first and/or second signal 9, 10 and receive a value:

$$(t_E - t_D) \times \frac{(t_C - t_A)}{(t_D - t_B)} \qquad (6)$$

from the second device 8. The value represents a turnaround time and allows for the difference in clock rates.

The first device 7 can store values of the times of transmission of the first and second signals 9, 10, namely $t_A$ and $t_C$, or the difference in the times the times of transmission of the first and second signals 9, 10, namely $(t_C-t_A)$ and receive a value:

$$\frac{(t_E - t_D)}{(t_D - t_B)} \qquad (7)$$

Once the first device 7 has received the third signal 11 from the second device 8, it can calculate a time of flight and a clock rate ratio $f_{clock\ 27}/f_{clock\ 15}$. The device 7 can check whether the time of flight and the clock rate ratio $f_{clock\ 27}/f_{clock\ 15}$ are acceptable. If the second device 8 receives copies of the first and second signals 9, 10 and a further delay d has been added to the copy of first signal 9, the clock rate ratio $f_{clock\ 27}/f_{clock\ 15}$ will be noticeably altered and the first device 7 can detect a relay attack.

As an alternative to using clock rate ratio $f_{clock\ 27}/f_{clock\ 15}$, the device 7 can simply compare the value of time difference $(t_C-t_A)$ between the times of transmission of the first and second signals 9, 10 from the first device 7 and the value of time difference $(t_D-t_B)$ between times of arrivals of the, or other, first and second signals 9, 10 at the second device 8 and determine whether the two values differ by an unacceptably high degree, for instance by exceeding a predefined value. The two values may be normalised before they are compared, for example by dividing by the time difference $(t_C-t_A)$.

Referring to FIG. 4, the first device 7 is shown in more detail. The device 7 comprises a processor 12 which is operatively connected to memory 13, a wireless transmitter and receiver 14 and clock 15. The clock 15 derives time from a frequency source 16, such as a crystal oscillator. Memory 13 includes non-volatile memory 17 storing a computer program 18 for controlling operation of the device shown in FIG. 4, a lookup table 19 for providing variable times of transmission of the second signal 10 (FIG. 3), a table 20 of expected values of $f_{clock\ 27}/f_{clock\ 15}$ and a table 21 of expected values of time of flight. The computer program 18 may be downloaded in a signal (not shown) over a wired or wireless connection (not shown). The wireless transmitter and receiver 14 is in the form of an ultra-high frequency transceiver and is connected to an antenna 22. The wireless transmitter and receiver 14 may comprise a separate transmitter (not shown) and a separate receiver (not shown). An external battery (not shown) may power the first device 7. Additionally or alternatively, the first device 7 may include an internal battery (not shown). The internal battery (not shown) may be charged by an external power source (not shown), such as a car battery or alternator. The first device 7 may optionally include a controller 23 for controlling external hardware (not shown). Alternatively, the processor 12 may control external hardware (not shown). If the first device 7 is used as part of a keyless entry system in a car, then the external hardware (not shown) may include a door-locking mechanism, an engine-starting system and/or a boot-locking mechanism. Additionally or alternatively, the controller 23 may be linked to a door handle sensor (not shown), so that lifting the door handle initiates transmission of the first signal 9 from the first device 7.

Referring to FIG. 5, the second device 8 is shown in more detail. The second device 8 comprises a processor 24 which is operatively connected to memory 25, a wireless transmitter and receiver 26 and a clock 27. The clock 27 derives times from a frequency source 28, for example a crystal oscillator. Memory 25 includes non-volatile memory 29 storing a computer program 30 for controlling operation of the device shown in FIG. 5. The computer program 30 may be installed during manufacture or downloaded in a signal (not shown) over a wired or wireless connection (not shown). The wireless transmitter and receiver 26 is in the form of an ultra-high frequency transceiver and is connected to an antenna 31. The second device 8 includes an internal battery (not shown). The second device 8 may be included in a key fob.

Figures 1, 6:
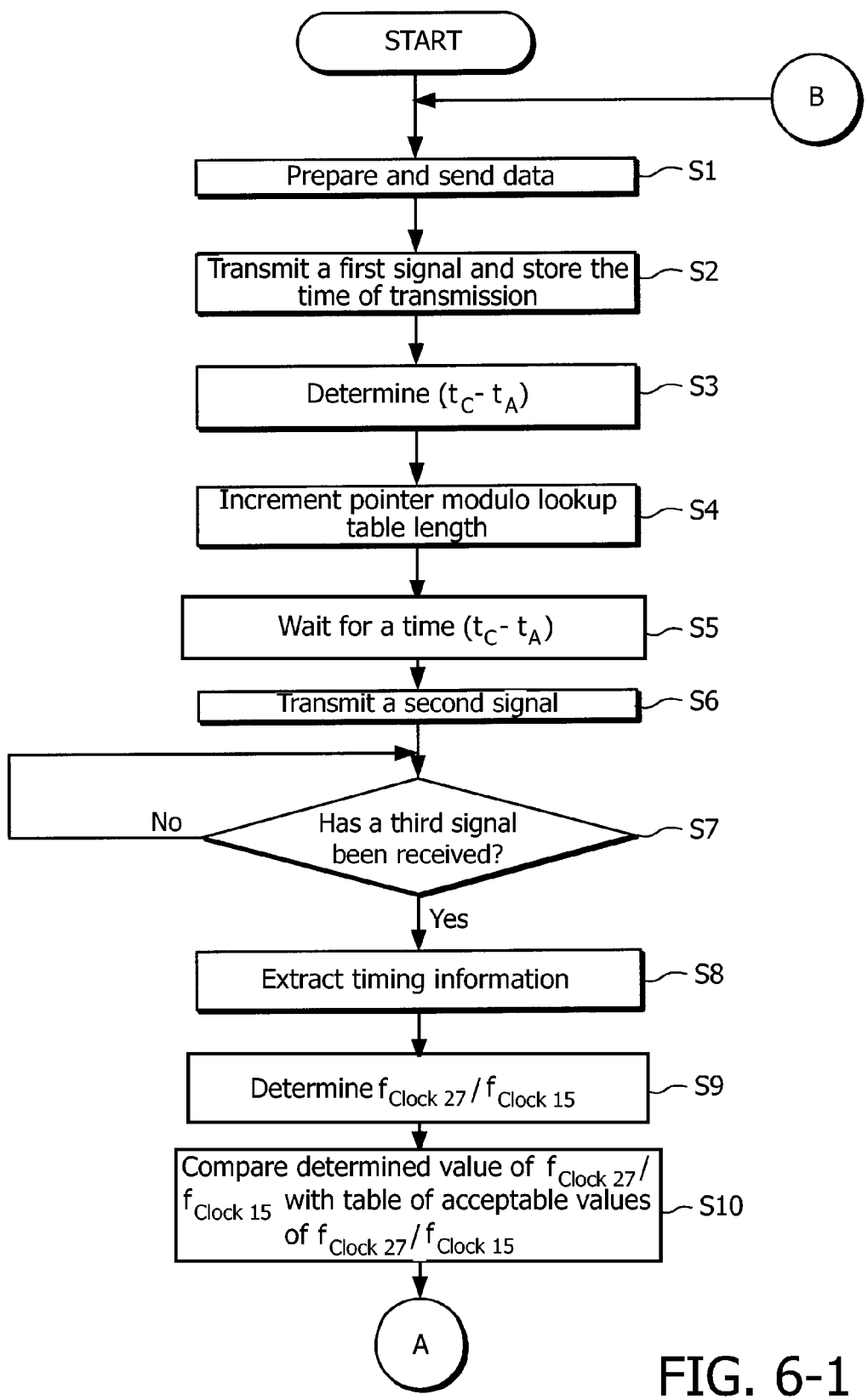
Figures 2, 6:
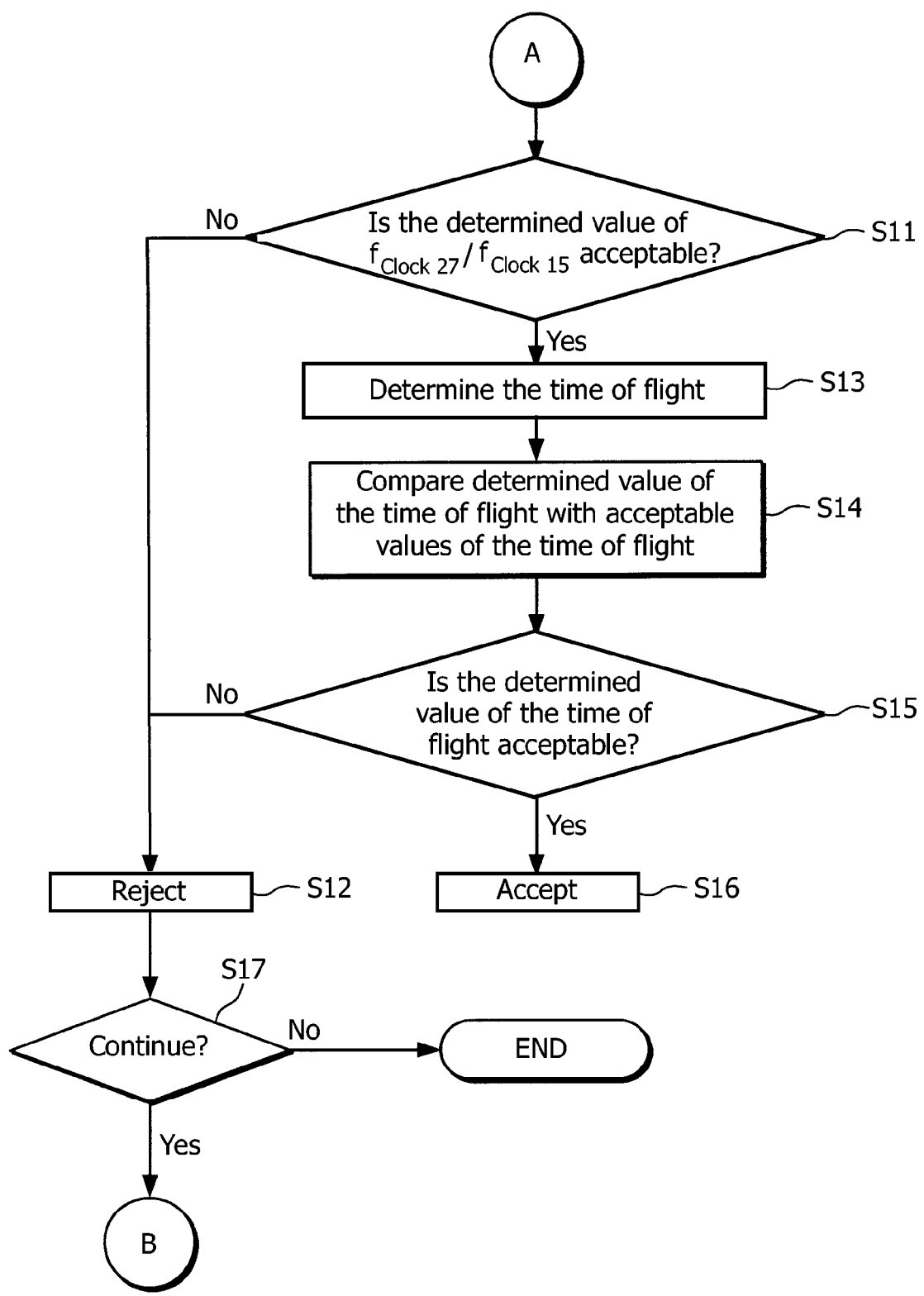

Referring to FIGS. 4 and 6, a method of operating the first device 7 in accordance with the present invention is shown.

The processor 12 in first device 7 may prepare and send data (not shown) to the wireless transmitter and receiver 14 for inclusion in the first signal 9 (step S1). The data (not shown) may include data for identifying the first device 7. The data (not shown) may be encrypted.

The time of transmission $t_A$ may be determined before transmission, i.e. be pre-determined or allocated, or determined during or after transmission, i.e. be measured. For example, if the time of transmission is predetermined the processor 12 may send the data (not shown) to the wireless transmitter and receiver 14 together with an instruction (not shown) to transmit the first signal 9 at a given time. If the time of transmission is measured, then the wireless transmitter and receiver 14 can return the measured time to the processor 12. Regardless of whether the time of transmission is pre-determined or measured, the time is determined according to the clock 15.

The wireless transmitter and receiver 14 transmits the first signal 9 and the processor 12 stores the time of transmission $t_A$ in memory 13 (step S2). In this example, the processor 12 uses a pointer (not shown) to select, from the lookup table 19, a pseudo-random value of time difference $(t_C-t_A)$ between the times of transmission of the first and second signals 9, 10 (step S3). After each set of signals 9, 10, 11 is transmitted, the processor 12 increments the pointer (not shown) to the next value in the lookup table 19 (step S4). After reaching a final value in the lookup table 19, the pointer (not shown) returns to an initial value in the lookup table 19. The process is similar to the use of "rolling codes" which can be used to generate varying challenge messages.

The processor 12 waits for a time period ($t_C - t_A$) to elapse (step S5). The wireless transmitter and receiver 14 transmits the second signal 10 at a time $t_C$ (step S6).

The processor 12 checks whether a signal, i.e. the third signal 11, has been received by the wireless transmitter and receiver 17 (step S7). Once a signal has been received, the processor 12 extracts timing information from the signal (step S8) and determines the clock rate ratio $f_{clock\ 27}/f_{clock\ 15}$ (step S9). The processor 12 compares the determined value of the clock rate ratio $f_{clock\ 27}/f_{clock\ 15}$ with a range of expected values, in this case a set of expected values stored in table 20, (step S10) and determines whether the determined value of the clock rate ratio $f_{clock\ 27}/f_{clock\ 15}$ falls within an expected range, for example by matching a value within the table 20 or by falling between an predefined upper limit and a predefined lower limit, and, if so, is acceptable (step S11). If the determined value of the clock rate ratio $f_{clock\ 27}/f_{clock\ 15}$ is unacceptable, then the processor 12 rejects the set of measurements (step S12). If the first device 7 is being used in a keyless entry system, then entry is refused. If, however, the determined value of the clock rate ratio $f_{clock\ 27}/f_{clock\ 15}$ is acceptable, then the processor determines a value of time of flight (step S13).

The processor 12 compares the determined value of time of flight with expected range of values, in this example a set of expected values stored in table 21 (step S14), and determines whether the determined value of time of flight is acceptable (step S15). If the determined value of time of flight is unacceptable, then the processor 12 rejects the set of measurements (step S12). If, however, the determined value of time of flight is acceptable, then the processor 12 accepts the set of measurements (step S16). If the first device 7 is being used in a keyless entry system, then entry is authorised. The processor 12 may store the determined value of the clock rate ratio $f_{clock\ 27}/f_{clock\ 15}$ in table 20 and/or the determined value of time of flight in table 21. If the device has rejected a set of measurements, then it may repeat the process (step S17).

Figure 7:
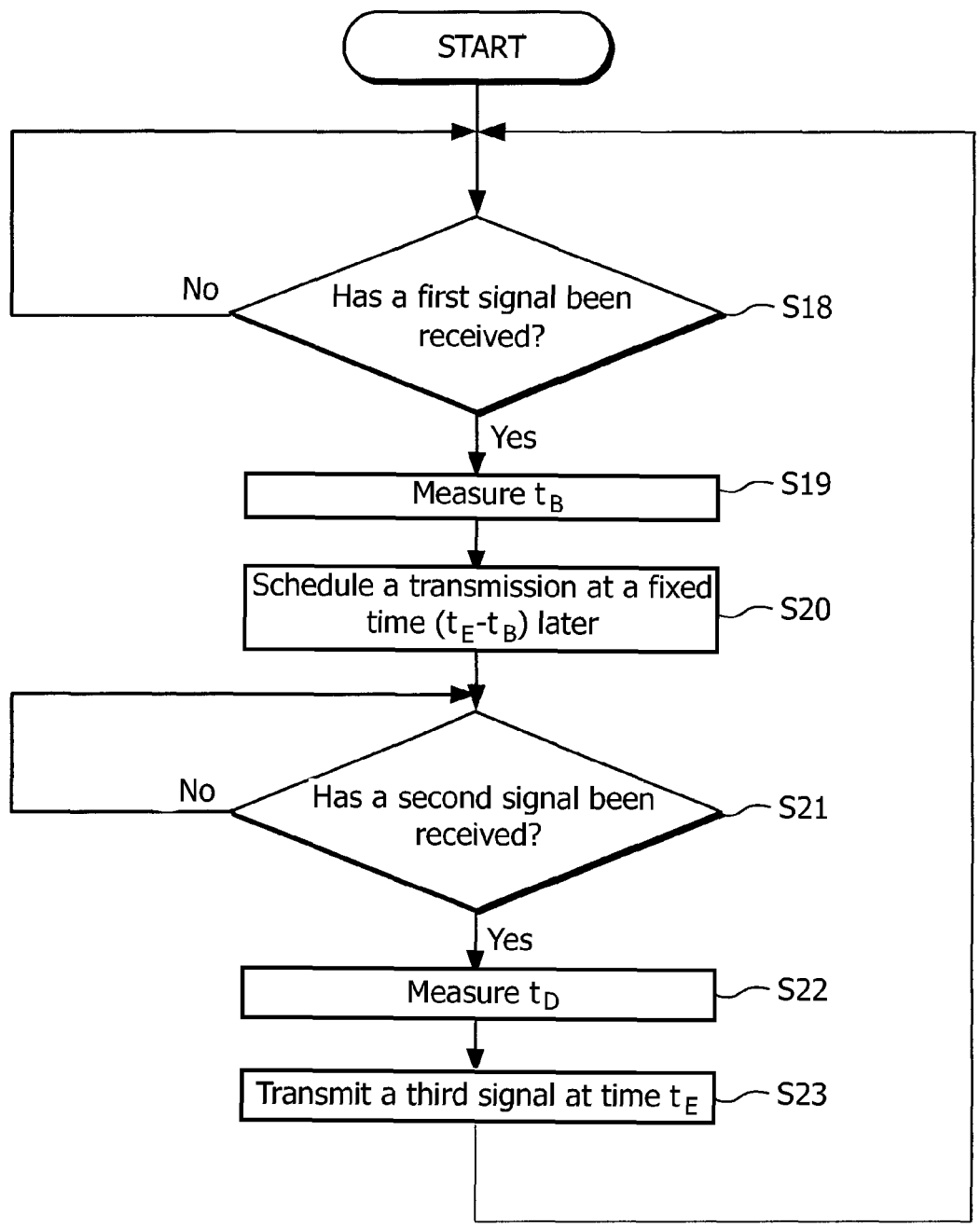
FIG. 7 is a process flow diagram of a method of operating the second device shown in FIG. 5 in accordance with the present invention.

Referring to FIGS. 5 and 7, a method of operating the second device 8 in accordance with the present invention is shown.

The processor 24 checks whether a signal, i.e. the first signal 9, has been received by the wireless transmitter and receiver 26 (step S18). If a signal is received, the processor 24 measures its time of arrival $t_B$ (step S19). The processor 24 schedules time of transmission of the third signal 11, i.e. $t_E$, for a predetermined time later ($t_E - t_B$) (step S20). The predetermined time may be fixed or may vary from one set of signals to the next. The processor 24 checks whether a signal, i.e. the second signal 10, has been received by the wireless transmitter and receiver 26 (step S21). If a signal is received, the processor 24 measures its time of arrival $t_D$ (step S22). The processor 24 prepares information for obtaining the time difference between first and second times of arrival, for example the value of ($t_D - t_B$) or values of $t_B$ and $t_D$, and a value of time of transmission of the third signal 11, in other words $t_E$. The processor 24 forwards this to the wireless transmitter and receiver 26 for transmission in the third signal 11 (step S23).

From reading the present disclosure, other modifications will be apparent to persons skilled in the art. Such modifications may involve other features which are already known in the art of time of flight measurement and signalling and which may be used instead of or in addition to features already described herein. For example, identifying whether a further delay has been introduced may be carried out by another device such as an on-board computer.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A processing arrangement for ascertaining whether a set of measurements is acceptable as not being under relay attack for use in determining a time of flight of signals between first and second devices, the processing arrangement configured (i) to determine, measure or calculate a value of a first time difference between first and second times of transmission of respective first and second signals transmitted from a first device, the time of transmission of the second signal being chosen randomly or from a pseudo-random sequence, (ii) to determine, measure or calculate a value of a second time difference between first and second times of arrival of one selected from the group consisting of (ii)(a) the first and second signals received at a second device along a direct path between the first and second devices and (ii)(b) other first and second signals received at the second device along an indirect path between the first and second devices via a relaying device, wherein the other first and second signals comprise copies of the first and second signals delayed in time and transmitted by the relaying device in carrying out a relay attack, and (iii) to determine whether the value of the second time difference falls within a range of expected values based upon (iii)(a) the value of the first time difference and (iii)(b) a predefined condition, wherein responsive to the value of the second time difference falling within the range of expected values, the processing arrangement ascertains the set of measurements acceptable for use in determining the time of flight of signals between the first and second devices, otherwise the processing arrangement dismisses the set of measurements as unacceptable, signifying the relay attack.

2. The processing arrangement according to claim 1, wherein said range of expected values comprises a set of expected values, the processing arrangement further being configured to determine whether the value of the second time difference matches one of said expected values within said set.

3. The processing arrangement according to claim 1, wherein said range of expected values comprises a single expected value, the processing device further being configured to determine whether the value of the second time difference matches the single expected value.

4. The processing arrangement according to claim 1, wherein to determine whether the value of the second time difference falls within a range of expected values, the processing arrangement is configured to calculate a clock rate ratio of the values of the first and second time differences and to determine whether the clock rate ratio falls within a range of predefined ratios.

5. The processing arrangement according to claim 1, wherein to determine whether the value of the second time difference falls within a range of expected values, the processing arrangement is configured to calculate a difference between said values of the first and second time differences and to determine whether said calculated difference falls within a predetermined range of differences.

6. The processing arrangement according to claim 5, wherein the processing arrangement is configured to adjust by a factor dependent upon the value of the first time difference one selected from the group consisting of (i) the calculated difference between said values of the first and second time differences and (ii) the predetermined range of differences.

7. A first device for co-operating with a second device to ascertain whether a set of measurements is acceptable for use to determine a time of flight of signals between the first and second devices, the first device comprising a processing arrangement according to claim 1, a first transmitter, a first receiver and a first clock, the first device configured to transmit first and second signals, to determine first and second times of transmission using the first clock and to calculate a value of the first time difference between times of transmission.

8. The first device according to claim 7, wherein the first device is further configured to receive a third signal from the second device and to extract from the third signal information for use in obtaining a value of a second time difference between first and second times of arrival of one selected from the group consisting of (a) first and second signals received at the second device along the direct path between the first and second devices and (b) other first and second signals received at the second device along the indirect path between the first and second devices via the relaying device, wherein the other first and second signals comprise copies of the first and second signals delayed in time and transmitted by the relaying device in carrying out the relay attack.

9. The first device according to claim 8, wherein said information comprises the value of the second time difference between the first and second times of arrival at the second device.

10. The first device according to claim 7, wherein the first device is further configured to variably choose the second time of transmission with respect to the first time of transmission.

11. The first device according to claim 10, wherein the value of the first time difference between the first and second times of transmission of the respective first and second signals for a set of signals differs from a value of a first time difference between corresponding first and second times of transmission of respective first and second signals for a previous set of signals.

12. The first device according to claim 7, wherein said first transmitter and first receiver are provided in a transceiver.

13. A system comprising a first device according to claim 7 and a second device, the second device comprising a second transmitter, a second receiver and a second clock, the second device configured (i) to receive one selected from the group consisting of (i)(a) the first and second signals along the direct path between the first and second devices and (i)(b) other first and second signals along the indirect path between the first and second devices via the relaying device, wherein the other first and second signals comprise copies of the first and second signals delayed in time and transmitted by the relaying device in carrying out the relay attack, (ii) to determine times of arrival of the (ii)(a) first and second signals or (ii)(b) other first and second signals using the second clock, (iii) to prepare information for use in obtaining the value of the difference between times of arrival of the (iii)(a) first and second signals or (iii)(b) other first and second signals and (iv) to transmit a third signal including the information.

14. A non-transitory computer-readable medium including a program of instructions which, when executed by data processing apparatus, causes said data processing apparatus to perform a method of ascertaining whether a set of measurements is acceptable as not being under relay attack for use in determining a time of flight of signals between first and second devices, the method comprising:
    determining, measuring, or calculating a value of a first time difference between first and second times of transmission of respective first and second signals transmitted from a first device, the second time of transmission being chosen randomly or from a pseudo-random sequence;
    determining, measuring, or calculating a value of a second time difference between first and second times of arrival of one selected from the group consisting of (a) the first and second signals received at a second device along a direct path between the first and second devices and (b) other first and second signals received at the second device along an indirect path between the first and second devices via a relaying device, wherein the other first and second signals comprise copies of the first and second signals delayed in time and transmitted by the relaying device in carrying out a relay attack; and
    determining whether the value of the second time difference falls within a range of expected values based upon the value of the first time difference and a predefined condition, wherein responsive to the value of the second time difference falling within the range of expected values, the method ascertains the set of measurements acceptable for use in determining the time of flight of signals between the first and second devices, otherwise the method dismisses the set of measurements is as unacceptable, signifying the relay attack.

15. A method of ascertaining whether a set of measurements is acceptable as not being under relay attack for use in determining time of flight of signals between first and second devices, the method comprising:
    determining, measuring, or calculating a value of a first time difference between first and second times of transmission of respective first and second signals transmitted from a first device, the second time of transmission being chosen randomly or from a pseudo-random sequence;
    determining, measuring, or calculating a value of a second time difference between first and second times of arrival of one selected from the group consisting of (a) the first and second signals received at a second device along a direct path between the first and second devices and (b) other first and second signals received at the second device along an indirect path between the first and second devices via a relaying device, wherein the other first and second signals comprise copies of the first and second signals delayed in time and transmitted by the relaying device in carrying out a relay attack; and
    determining whether the value of the second time difference falls within a range of expected values based upon the value of the first time difference and a predefined condition, wherein responsive to the value of the second time difference falling within the range of expected values, the method ascertains the set of measurements acceptable for use in determining the time of flight of signals between the first and second devices, otherwise the method dismisses the set of measurements is as unacceptable, signifying the relay attack.

16. The method according to claim 15, wherein determining whether the value of the second time difference falls within the range of expected values comprises:
    determining whether the value of the second time difference matches one expected value within a set of expected values.

17. The method according to claim 15, wherein determining whether the value of the second time difference falls within the range of expected values comprises:
    determining whether the value of the second time difference matches an expected value.

18. The method according to claim 15, wherein determining whether the value of the second time difference falls within the range of expected values comprises:
    calculating a clock rate ratio of the values of the first and second time differences; and
    determining whether the clock rate ratio falls within a range of predefined ratios.

19. The method according to claim 15, wherein determining whether the value of the second time difference falls within the range of expected values comprises:
    calculating a difference between said values of the first and second time differences; and
    determining whether said calculated difference falls within a predetermined range of differences.

20. The method according to claim 19, comprising:
    adjusting by a factor dependent upon the value of the first time difference one selected from the group consisting of (i) the calculated difference between said values of the first and second time differences and (ii) the predetermined range of differences.

21. The method according to claim 15, further comprising:
    transmitting first and second signals,
    determining first and second times of transmission using a first clock; and
    calculating a value of the first time difference between times of transmission.

22. The method according to claim 21, further comprising:
    receiving a third signal; and
    extracting from the third signal information for use in obtaining a value of a second time difference between first and second times of arrival of one selected from the group consisting of (a) the first and second signals received at the second device along the direct path between the first and second devices and (b) other first and second signals received at the second device along the indirect path between the first and second devices via the relaying device, wherein the other first and second signals comprise copies of the first and second signals delayed in time and transmitted by the relaying device in carrying out the relay attack.

23. The method according to claim 22, further comprising:
    obtaining the value of the second time difference between the first and second times of arrival at the second device.

24. The method according to claim 23, wherein obtaining the value of the second time difference between the first and second times of arrival at the second device comprises reading the value.

25. The method according to claim 21, further comprising:
    variably choosing the second time of transmission with respect to the first time of transmission.

26. The method according to claim 25, further comprising:
    differing the value of the first time difference between the first and second times of transmission of the respective first and second signals for a set of signals from a value of a first time difference between corresponding first and second times of transmission of respective first and second signals for a previous set of signals.

* * * * *